United States Patent [19]

Kawakami et al.

[11] Patent Number: 4,898,905
[45] Date of Patent: Feb. 6, 1990

[54] SLIDING MATERIAL

[75] Inventors: Shinya Kawakami; Masaharu Kikuchi, both of Toyota, Japan

[73] Assignee: Taiho Kogyo Co., Ltd., Toyoto, Japan

[21] Appl. No.: 217,522

[22] Filed: Jul. 11, 1988

[30] Foreign Application Priority Data

Jul. 13, 1987 [JP]  Japan ................................. 62-172955

[51] Int. Cl.$^4$ ........................... C08K 3/38; C08K 3/36; C08K 3/34; C08K 3/04
[52] U.S. Cl. ................................. 524/404; 524/406; 524/439; 524/495; 524/496; 524/514
[58] Field of Search ............... 524/602, 600, 514, 406, 524/439, 404, 495, 496

[56] References Cited

U.S. PATENT DOCUMENTS

| 4,302,379 | 11/1981 | Ueda et al. | 524/404 |
| 4,316,834 | 2/1982 | Ueda et al. | 524/404 |
| 4,360,626 | 11/1982 | Manwiller | 524/600 |

Primary Examiner—Lewis T. Jacobs
Attorney, Agent, or Firm—Armstrong, Nikaido Marmelstein, Kubovcik & Murray

[57] ABSTRACT

A sliding material used under a boundary lubricating conditions or mixed lubricating condition, and having improved, wear-resistance, low-friction property, and seizure-resistance, and consisting of (a) 10 to less than 69% of polyimide and/or polyamide-imide, from more than 30 to 68% of graphite, and, 1 to less than 30% of polytetrafluroethylene, $MoS_2$, Pb, and/or BN, or (b) 20 to 90% of polyimide and/or polyamide-imide, and from 0.5 to 20% clay, mullite, silica, and/or alumina, and at least 5% and balance of graphite.

7 Claims, No Drawings

SLIDING MATERIAL

BACKGROUND OF INVENTION

1. Field of Invention

The present invention relates to sliding material, more particularly the resin-based sliding material, in which polyimide or polyamide-imide is used as a binder.

2. Description of Related Arts

The heretofore generally used carbon (graphite) based sliding material is produced by using the phenol resin as a binder and by means of hot-pressing. In such sliding material, the phenol resin may be decomposed due to heat generation under high-speed condition or severe lubricating condition, since the heat-resistance of phenol resin is low.

Japanese Unexamined Patent Publication No. 52-44871 discloses resin-based sliding material consisting of from 30 to 70% by weight of binding component, i.e, polyimide resin, and from 30 to 70% by weight of polytetrafluoroethylene. This Japanese Unexamied Patent Publication also discloses the use of graphite as the lubricant. As an example of the composition containing graphite, 53% of polyimide, 1.5% of polyamide imide, 30% of polytetrafluoroethylene, and 2% of graphite is mentioned in this publication.

According to the investigations by the present inventors, the resin-based sliding material of Japanese Unexamined Patent Publication No. 52-44871 has poor wear-resistance under boundary lubricating condition and mixed lubricating condition.

SUMMARY OF INVENTION

It is an object of the present invention to provide a resin-based sliding material exhibiting improved, seizure-resistance, wear-resistance, and low-friction property, under boundary lubricating conditions and mixed lubricating conditions.

In accordance with the objects of the present invention, there is provided a sliding material consisting essentially of from more than 30 to 60% by weight of graphite, from 1 to less than 30% of at least one lubricant selected from the group consisting of polytetrafluoroethylene, and $MoS_2$, Pb, and BN, from 10 to less than 69% by weight of at least one member selected from the group consisting of polyimide and polyamide-imide. This sliding material is hereinafter referred to as the basic sliding material.

There is also provided sliding material consisting essentially of from 20 to 90% by weight of at least one member selected from the group consisting of polyimide and polyamide-imide, and from 0.5 to 20% by weight of at least one friction-controlling agent selected from the group consisting of clay, mullite, silica, and alumina, and, at least 5% by weight and balance of graphite.

There is further provided sliding material consisting essentially of from 20 to 90% by weight of at least one member selected from the group consisting of polyimide and polyamide-imide, from 0.5 to 20% by weight of at least one friction-controlling agent selected from the group consisting of clay, mullite, silica, and alumina, and at least one lubricant consisting of the group of (i) not more than 30% by weight of polytetrafluoroethylene, $MoS_2$, Pb, and/or BN, and (ii) not more than 10% by volume of oil, and at least 5% by weight and balance of graphite.

DESCRIPTION OF PREFERRED EMBODIMENTS

The sliding materials according to the present invention can be used in the form of a bimetal. In this case, the metal substrate used enhances the load capacity of the sliding layer and contributes to the thickness-decrease of sliding layer by excellent strength of substrate. In addition, the metal substrate used enhances the seizure-resistance of the sliding layer by excellent heat conductivity of substrate, thereby allowing heat to escape through the substrate. Steel sheet is usually used for the substrate. Other metals, such as aluminum and copper-alloy sheets may also be used for substrate.

The substrate is provided on the surface thereof with a roughened part for enhancing the bonding strength between the substrate and sliding layer mainly composed of resin and graphite. The roughened surface part of the substrate may be provided by disposing on the surface of substrate a sintered layer of copper or copper-alloy powder or iron or iron-alloy powder, or a fusion-sprayed layer of metal or ceramics. Alternatively, the roughened part may be formed on the substrate by means of shot-blasting, etching, and the like.

The sliding material according to the present invention can be also used in the form of solid sliding member.

The composition of sliding material, which is used as sliding layer on a metal substrate or as the solid sliding layer, is hereinafter described.

The polyimide and polyamide-imide are resins having excellent heat-resistance. The polyimide and polyamide-imide are used to impart heat-resistance to sliding material by utilizing heat-resistant property thereof. These resins are relatively flexible. By utilizing this property, these resins are used to enhance the load capacity. Since these resins can be worked by bending, the bimetal material can be bent and fixed to a housing. Polyimide ester, aromatic polyimide, polyether imide, bismaleimide in the solid or liquid form can be used as the polyimide. Either addition or condensation-type, preferably condensation type polymer is used as the polyimide and polyamide imide.

The quantity of polyimide and polyamide-imide used in the sliding material according to the present invention is from 10 to 69% by weight in the basic sliding material and from 20 to 90% by weight in the sliding materials containing clay, mullite, silica, and/or alumina. The clay, mullite, silica, and/or alumina are hereinafter referred to as the clay and the like. The percentage herein is the weight percentage, unless otherwise specified. When the quantity of polyimide and polyamide-imide used is less than the above mentioned minimum values, the bonding strength of the components of sliding material is too weak so that the wear amount of sliding material is increased. On the other hand, if the quantity of polyimide and polyamide-imide used is more than the above mentioned maximum values, the coefficient of friction is increased so that the wear amount of sliding material is also increased. Preferred quantity of polyimide and polyimide-amide used is from 20 to 60%, particularly from 30 to 60%, in the basic material and from 30 to 60% in the case of sliding material containing the clay and the like.

Graphite used in the sliding materials according to the present invention includes graphite and ritreous and is bonded by the polyimide or polyimide-amide and imparts mainly good friction property to the sliding material. Graphite may be synthetic or natural graphite. The particle shape of graphite may be spherical or flaky. In the light of wear-resistance, the particle diameter of graphite is preferably 250 μm or less, and the crystal property is preferably such that, when measured by X-ray, the inter-plane distance $d_{(002)}$ of (002) is 3.50 Å or less. Since the cleavage of graphite having this interplane distance is easy, flat major plane of the graphite particles is disposed on the surface of sliding material, so that the proportion of graphite on the sliding surface is so advantageously increased as to reduce the coefficient of friction. The quantity of graphite used in sliding material is from more than 30 to 60% in the basic sliding material, and balance of the other components but at least 5% in the sliding material containing the clay and the like. When the quantity of graphite used is less than the above mentioned minimum values, the coefficient of friction is disadvantageously high, and the wear resistance is disadvantageously low. On the other hand, when the quantity of graphite used is more than the above mentioned maximum values, the bonding strength due to resin and the bonding strength between the metal substrate and sliding layer are too low, so that the wear resistance is disadvantageously low. Preferred quantity of graphite used is from 40% to 60% in the basic sliding material and from 30 to 60% in the case of sliding material containing the clay and the like. Incidentally, in the above mentioned Japanese Unexamined Patent Publication No. 52-44871, the solid lubricant, e.g, graphite, is used in quantity of 10% or less based on the total of synthetic resin for forming film. In this case, the wear amount of sliding material measured under the conditions of present example is at least approximately twice as compared with the sliding material having the composition within the inventive range. Accordingly, the graphite used in a considerably higher content than the prior art is effective for attaining a high wear-resistance.

The polytetrafluoroethylene $MoS_2$, Pb and BN (hereinafter referred to as the PTFE and the like) used in the basic sliding material impart the lubricating property and low-friction property to the sliding material. PTFE and the like are used in the basic sliding material in quantity of from 1 to less than 30%. When the quantity of PTFE and the like used is less than 1%, the coefficient of friction is so high that the wear-resistance is disadvantageously high. On the other hand, when the quantity of PTFE used is 30% or more, the heat-resistance of sliding material, strength, and wear resistance are disadvantageously low. Preferred quantity of PTFE used is from 5 to 20%. Preferred quantity of $MoS_2$ is from 5 to 20%, Preferred quantity of Pb is from 10 to 30%, Preferred quantity of BN is from 5 to 20%.

The clay and the like are hard material. Their hardness is utilized to enhance wear-resistance of sliding material. The clay minerals can generally be used as the clay in sliding material according to the present invention. Preferably, calcined clay is used in the present invention. The calcined clay is prepared by preliminarily calcining the clay at a temperature less than 500°-600° C. The alumina, (amorphous) silica, and mullite can be used as a component of the clay but may also be used as the separate component from clay. When the quantity of the clay and the like used is less than 0.5%, the wear-resistance is unsatisfactory. On the other hand, when the quantity of clay used and the like is more than 20%, the opposed member is damaged by the sliding material to form the flaws thereon, and the wear-resistance of opposed member becomes unsatisfactory. Preferred quantity of clay and the like used is from 5 to 15%.

In order to improve the lubrication property of sliding material containing the clay and the like, solid lubricant selected from the group consisting of $MoS_2$, Pb and BN can be included in the sliding material. PTFE can be contained in the sliding material containing the clay and the like. The quantity of the solid lubricant used is not more than 30%, since strength and heat-resistance of sliding material are disadvantageously lessened at quantities of less than 30%. Preferred quantity used of solid lubricant is 2% or more. More preferred quantity of used solid lubricant is 5 to 20%.

In addition, oil selected from the group consisting of silicone oil, machine oil, turbine oil, and mineral oil can be used in addition to or instead of the solid lubricant. When the quantity of oil used is more than 10% by volume, strength and heat-resistance of sliding material are disadvantageously lessened. Preferred quantity of oil used is 0.1% by volume or more. More preferred quantity of oil used is from 1 to 10% by volume.

A method for producing the sliding material according to the present invention is described hereinafter in detail.

First, in the case of sliding material in the form of bimetal, a metal substrate is subjected to roughening of the surface thereof. The roughening methods are not specifically limited at all. However, preferred combinations of a metal substrate and roughening method are as follows: a steel sheet-sinter of copper-series powder or fusion-spraying of ceramics; an aluminum-alloy rolled sheet—etching including anodic oxidation or shot blasting; and, a copper-alloy sheet—etching or shot blasting. In the sintering method, powder having particle diameter of from 80 to 150 μm is dispersed on the metal substrate, so as to form a layer which can provide the desired thickness of sintered layer. Then, heating is carried out up to a temperature which is lower than the melting point of powder, and at which bonding between the powder particles occurs. In the shot blasting method, such grains having sharp edges as cut wire, calcined alumina, glass beads and the like, are injected at a high speed onto the metal substrate. In the etching method, minute unevenesses are formed on a metal substrate by selective etchant, such as concentrated hydrochloric acid for etching of copper, and caustic soda for etching of aluminum.

The components of sliding layer are then impregnated into the roughened uneven parts and are dispersed on the metal substrate as a layer on the top part of these parts. For this purpose, the components of sliding layer are applied on the metal substrate together with dispersion-liquid, such as diethyl acetamide. Alternatively, dry components of sliding layer are applied by means of a roller and the like on the metal substrate by pressure. Solvent, which is frequently contained in the resin component, i.e., polyimide or polyamide-imide, is vaporized together with the dispersing agent, during the subsequent drying step. The drying temperature is dependent upon the kinds of resins but is usually from 60° to 120° C. Thickness of the sliding layer at the drying step is from 20 to 100 μm. The metal substrate is then passed between upper and lower rolls to rigidly hold the components of sliding layer by metal substrate. Baking at high temperature is then carried out to cure the resin. The baking temperature is dependent upon kinds of resin but is usually from 150° to 300° C. The metal substrate, on which sliding layer is attached, is then shaped to a determined form. More specifically, when the sliding material is used as a bush, the metal substrate is bent in a spherical form in such a manner that the sliding layer is positioned inside. The metal substrate is then usually forced into a housing, and, finally, the inner surface is machined to provide the determined dimension of sliding layer. Polyimide and polyamide-imide can be thickly applied as compared with the application of PTFE. Accordingly, the sliding layer can be left on metal substrate even by machining at a satisfactory finishing allowance. When the sliding layer is as thick as 100–300 μm, or when the inner diameter of a bush is small, the components of sliding material can be first shaped and then baked. In this case, the sliding layer maintaining soft state after drying step is bent together with the metal substrate, and baking is then carried out. Any crack generation of the thick sliding layer or during machining the small inner diameter-layer can be prevented by this process. The components of sliding material can occasionally be baked before shaping.

In the case of solid sliding material, the components of sliding layer and solvent are blended, formed, and then baked. Thickness of solid sliding material is usually in the range of from 0.5 to 10 mm.

The improved sliding properties, particularly a high wear-resistance of basic sliding material are believed to be attained by unique functions of graphite. That is, the graphite is conventionally used for enhancing the lubricating property or lowering the coefficient of friction. According to the investigations by the present inventors of the polyimide/polyamide-imide—graphite—PTFE series sliding material, it turned out that at a higher quantity graphite than the known one the coefficient of friction is increased only slightly or is lessened depending upon the quantity of graphite, and, the wear-resistance is improved within the inventive range of graphite.

The sliding material, in which the graphite is bonded by polyimide and polyamide-imide, the heat-resistance is high because of excellent heat-resitance of polyimide and polyamide-imide. Graphite having excellent friction property and the clay and the like having excellent wear-resistance can impart to the mixture excellent heat-resistance, friction property, wear-resistance, and seizure-resistance.

Polyimide and polyamide-imide having excellent flexibility bind the graphite, and, therefore the load capacity is so enhanced that the sliding material can be used up to a high load region. Polyimide and polyamide-imide are resins having excellent heat-resistance. Accordingly, their high-temperature strength is excellent and their flow under high temperature is not liable to occur. Wear-resistance of polyimide and polyamide-imide is excellent among the resins. Wear-resistance of sliding material containing polyimide or polyamide-imide is further enhanced by clay and the like added to this material.

The solid lubricant and oil improve the sliding properties under boundary and mixed lubricating conditions.

The present invention is further described by way of examples.

EXAMPLE

The sliding layer was formed using the following starting materials: polyimide; polyimide-amide; graphite (interplane distance $d_{(200)}=3.40$ Å, the greatest diameter = 70 μm, grain size of powder——200 mesh; clay (kaolinite clay); mullite; silica (amorphous silica, grain size of powder——325 mesh); alumina (grain size——325 mesh); oil (silicone oil); PTFE; $MoS_2$; Pb (−200 mesh); and, BN.

As metal substrates, carbon-steel sheets 140 mm × 1.5 mm in size were prepared. Bronze powder (10% Sn-containing Cu, +80 mesh, −150 mesh) was prepared for forming roughened parts on the metal substrates. After degreasing of the metal substrates, the bronze powder was deposited on the metal substrates at amount of 0.05–1 g/cm². Subsequently, the sintering was carried out at 830°–850° C. to form approximately 150 μm thick roughened parts. The porosity of roughened parts calculated based on the bronze was 40–80%.

The components of sliding material were thoroughly blended with solvent and then impregnated into the roughened parts. After drying at 100° C., the components of sliding layer were cold-pressed to solidify the components and were then baked at 250° C., thereby forming an approximately 80 μm thick sliding layer of bimetal sliding samples.

The same compositions of bimetal samples were molded and baked at 250° C., thereby forming 4 mm thick solid samples. The coefficient of friction and wear amount were measured by means of a cylindrical flat-plate type tester of friction and wear. The flat surface of samples of sliding material were brought into contact with a test shaft of hardened S55C rotating at a circumeferential speed of 5 m/sec. One drop of oil was applied onto the test shaft. The rotation and contact were continued for 60 minutes, while the coefficient of friction and wear amount were measured. The coefficient of friction became virtually constant after sliding of 1 km of distance. The results were shown in Table 1.

TABLE 1

| Samples | PI | PAI | Gr | Clay | Mullite | Silica | Alumina | PTFE | $MoS_2$ | Pb | BN | Oil | Phenol | Coefficient of Friction | Wear Amount (a) (mm³) | Wear Amount (b) (mm³) |
|---|---|---|---|---|---|---|---|---|---|---|---|---|---|---|---|---|
| 1 | 80 | — | 5 | 15 | — | — | — | — | — | — | — | — | — | 0.15 | 0.85 | 0.95 |
| 2 | 50 | 40 | 8 | — | 2 | — | — | — | — | — | — | — | — | 0.14 | 0.97 | 1.08 |
| 3 | — | 80 | 16 | 2 | — | — | 2 | — | — | — | — | — | — | 0.13 | 0.78 | 0.87 |
| 4 | 70 | — | 24 | 6 | — | — | — | — | — | — | — | — | — | 0.13 | 0.60 | 0.81 |
| 5 | 55 | — | 30 | — | 15 | — | — | — | — | — | — | — | — | 0.13 | 0.40 | 0.46 |
| 6 | — | 50 | 38 | 3 | 3 | 3 | 3 | — | — | — | — | — | — | 0.13 | 0.39 | 0.45 |
| 7 | 50 | — | 46 | — | — | 14 | — | — | — | — | — | — | — | 0.13 | 0.35 | 0.39 |
| 8 | 40 | — | 50 | 10 | — | — | — | — | — | — | — | — | — | 0.13 | 0.45 | 0.52 |
| 9 | 45.5 | — | 54 | 0.5 | — | — | — | — | — | — | — | — | — | 0.12 | 0.49 | 0.55 |
| 10 | 20 | — | 60 | 10 | — | 10 | — | — | — | — | — | — | — | 0.13 | 0.30 | 0.35 |
| 11 | 90 | — | 5 | 2 | — | — | — | 3 | — | — | — | — | — | 0.13 | 1.17 | 1.30 |
| 12 | 35 | 40 | 9 | — | 4 | — | 4 | — | 4 | 4 | — | — | — | 0.12 | 0.92 | 1.03 |
| 13 | 70 | — | 14 | 7 | — | — | 4 | 5 | — | — | — | — | — | 0.11 | 0.81 | 0.91 |

TABLE 1-continued

| Samples | PI | PAI | Gr | Clay | Mullite | Silica | Alumina | PTFE | MoS$_2$ | Pb | BN | Oil | Phenol | Coefficient of Friction | Wear Amount (a) (mm$^3$) | Wear Amount (b) (mm$^3$) |
| --- | --- | --- | --- | --- | --- | --- | --- | --- | --- | --- | --- | --- | --- | --- | --- | --- |
| 14 | 65 | — | 20 | 5 | — | — | — | 10 | — | — | — | — | — | 0.10 | 0.76 | 0.85 |
| 15 | 20 | 20 | 28 | 3 | 3 | 3 | 3 | 5 | 5 | 5 | 5 | — | — | 0.09 | 0.54 | 0.61 |
| 16 | 30 | — | 35 | — | — | 5 | — | 30 | — | — | — | — | — | 0.08 | 0.64 | 0.72 |
| 17 | 40 | — | 45 | 10 | — | — | — | 5 | — | — | — | — | — | 0.11 | 0.45 | 0.51 |
| 18 | 25 | — | 50 | 5 | 5 | — | — | 15 | — | — | — | — | — | 0.09 | 0.47 | 0.53 |
| 19 | 21 | — | 57 | 20 | — | — | — | 2 | — | — | — | — | — | 0.12 | 0.33 | 0.38 |
| 20 | — | 35 | 60 | 0.5 | — | — | — | — | 4.5 | — | — | — | — | 0.10 | 0.50 | 0.57 |
| 21 | 40 | — | 50 | 10 | — | — | — | — | — | — | — | 5 | — | 0.09 | 0.37 | 0.42 |
| 22 | 40 | — | 50 | 10 | — | — | — | — | — | — | — | 0.1 | — | 0.11 | 0.38 | 0.43 |
| 23 | 40 | — | 45 | 10 | — | — | — | 5 | — | — | — | 5 | — | 0.09 | 0.40 | 0.46 |
| 24 | 40 | — | 45 | 10 | — | — | — | 5 | — | — | — | 10 | — | 0.07 | 0.40 | 0.45 |
| 25* | — | — | 50 | 10 | — | — | — | — | — | — | — | — | 40 | 0.14 | 2.43 | 2.91 |
| 26* | — | — | 10 | 10 | — | — | — | 5 | — | — | — | — | 40 | 0.11 | 2.55 | 3.10 |

Remarks: *Comparative

In Table 1, the wear amounts (a) and (b) correspond to those of bimetal and solid material, respectively. In addition, the meaning of the symbols are: PI-polyimide; PAI-polyimide-amide; and, Gr-graphite. The percentage content of oil is based on volume.

There is no change in the coefficients of friction between the bimetal and solid material.

Comparative samples 25 and 26 are the examples of phenol resin as the resin component. The wear-resistance of these comparative samples is poor, since the resin has poor heat-resistance and decomposes.

EXAMPLE 2

The bimetal samples of basic sliding material were prepared and tested by the same method as in Example 1. The results are shown in Table 2.

In the comparative samples Nos. 44 and 45, the graphite and PTFE contents are lower and higher than the minimum and maximum values according to the present invention, respectively.

In this case, the wear-resistance is poor.

TABLE 2

| Samples | PI | PAI | Gr | Clay | Mullite | Silica | Alumina | PTFE | MoS$_2$ | Pb | BN | Oil | Phenol | Coefficient of Friction | Wear Amount (a) (mm$^3$) |
| --- | --- | --- | --- | --- | --- | --- | --- | --- | --- | --- | --- | --- | --- | --- | --- |
| 27 | 60 | — | 31 | — | — | — | — | 9 | — | — | — | — | — | 0.094 | 0.71 |
| 28 | 58 | — | 35 | — | — | — | — | 7 | — | — | — | — | — | 0.096 | 0.67 |
| 29 | 55 | — | 40 | — | — | — | — | 5 | — | — | — | — | — | 0.102 | 0.59 |
| 30 | 52 | — | 45 | — | — | — | — | 3 | — | — | — | — | — | 0.106 | 0.57 |
| 31 | 45 | — | 54 | — | — | — | — | 1 | — | — | — | — | — | 0.115 | 0.54 |
| 32 | 40 | — | 59 | — | — | — | — | 1 | — | — | — | — | — | 0.114 | 0.51 |
| 33 | 36 | — | 60 | — | — | — | — | 4 | — | — | — | — | — | 0.103 | 0.49 |
| 34 | 30 | 30 | 35 | — | — | — | — | 5 | — | — | — | — | — | 0.103 | 0.67 |
| 35 | 23 | 23 | 50 | — | — | — | — | 4 | — | — | — | — | — | 0.102 | 0.55 |
| 36 | — | 50 | 48 | — | — | — | — | 2 | — | — | — | — | — | 0.112 | 0.56 |
| 37 | 46 | — | 46 | — | — | — | — | — | 4 | 4 | — | — | — | 0.095 | 0.60 |
| 38 | 30 | 5 | 35 | — | — | — | — | 25 | — | 5 | — | — | — | 0.077 | 0.73 |
| 39 | 20 | 20 | 40 | — | — | — | — | 5 | 5 | 5 | 5 | — | — | 0.081 | 0.67 |
| 40 | 20 | 20 | 55 | — | — | — | — | 5 | — | — | — | 0.1 | — | 0.088 | 0.50 |
| 41 | 20 | 20 | 55 | — | — | — | — | 5 | — | — | — | 3 | — | 0.078 | 0.49 |
| 42 | 20 | 20 | 55 | — | — | — | — | 5 | — | — | — | 5 | — | 0.075 | 0.47 |
| 43 | 20 | 20 | 55 | — | — | — | — | 5 | — | — | — | 10 | — | 0.065 | 0.47 |
| 44* | 50 | 12 | 8 | — | — | — | — | 30 | — | — | — | — | — | 0.091 | 1.31 |
| 45* | 60 | — | 5 | — | — | — | — | 35 | — | — | — | — | — | 0.083 | 1.44 |

As is understood from the foregoing descriptions, sliding material having improved seizure-resistance, wear-resistance, and friction-property is provided by the present invention. These properties are demonstrated particularly when used for various bearings and seal parts operated under boundary or lubricating conditions in a compressor of cooler, transmission, turbo-charger, super-charger, water-pump, engine, power-steering, and the like.

We claim:

1. A sliding material for use under boundary lubricating condition or mixed lubricating condition, consisting essentially of from more than 30 to 60% by weight of graphite, from 1 to less than 30% by weight of at least one lubricant selected from the group consisting of polytetrafluoroethylene, MoS$_2$, Pb, and BN, and from 10 to less than 60% by weight of a polyimide and a polyamide-imide.

2. A sliding material according to claim 1, consisting essentially of from 40 to 60% by weight of graphite.

3. A sliding material according to claim 1, wherein said graphite has cleavaged flat major planes.

4. A sliding material according to claim 1, 2, or 3 further comprising not more than 10% by volume of oil.

5. A sliding material for use under a boundary lubricating condition or mixed lubricating condition, consisting essentially of from 20 to 90% by weight of a polyimide and a polyamide-imide, from 0.5 to 20% by weight of at least one friction-controlling agent selected from the group consisting of clay, mullite, silica, and alumina, and, at least 5% by weight graphite.

6. A sliding material according to claim 5, further comprising not more than 30% by weight of at least one lubricant selected from the group consisting of polytetrafluoroehylene, MoS$_2$, Pb, and BN.

7. A sliding material according to claim 5 or 6, further comprising not more than 10% by volume of oil.

* * * * *